Feb. 9, 1954 S. GOODFELLOW 2,668,582
ARMREST FOR VEHICLE SEATS
Filed Oct. 9, 1948 3 Sheets-Sheet 1
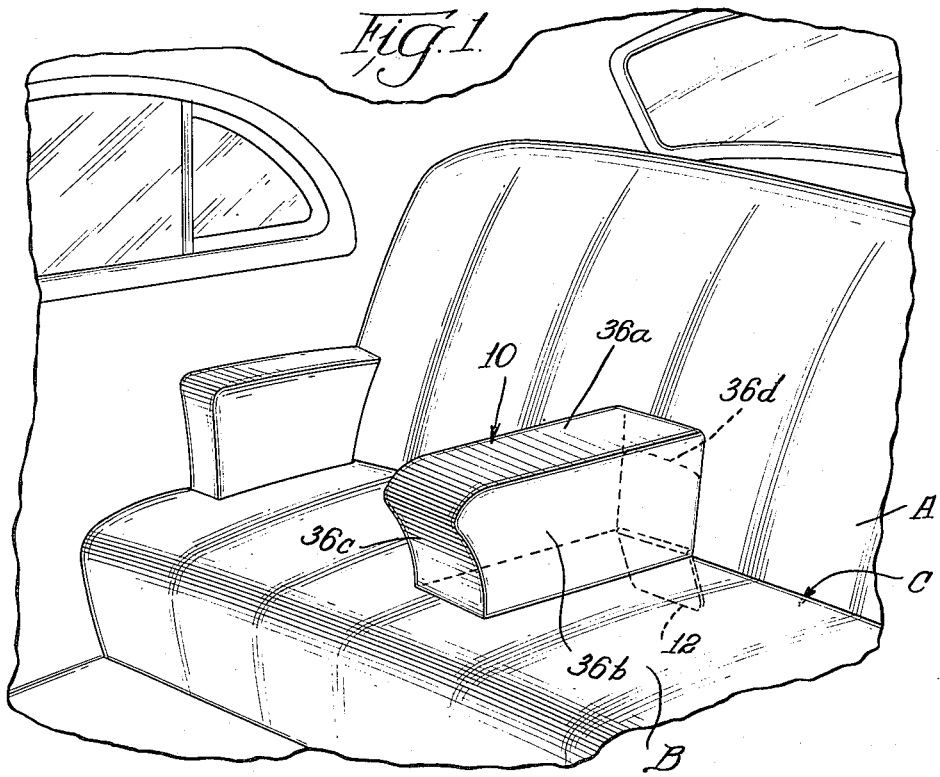
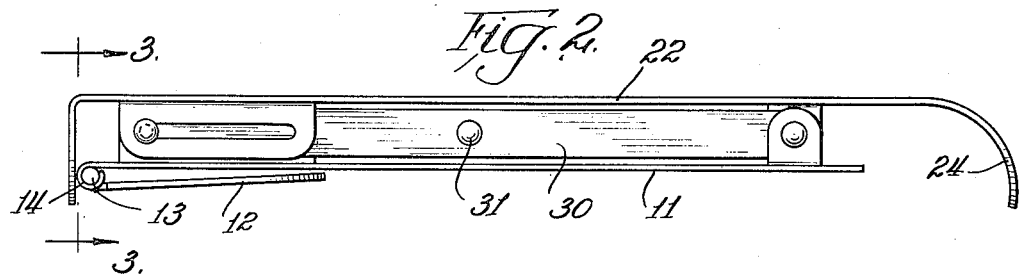
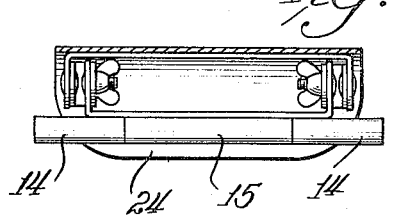
INVENTOR.
Sumner Goodfellow
BY
Atty.

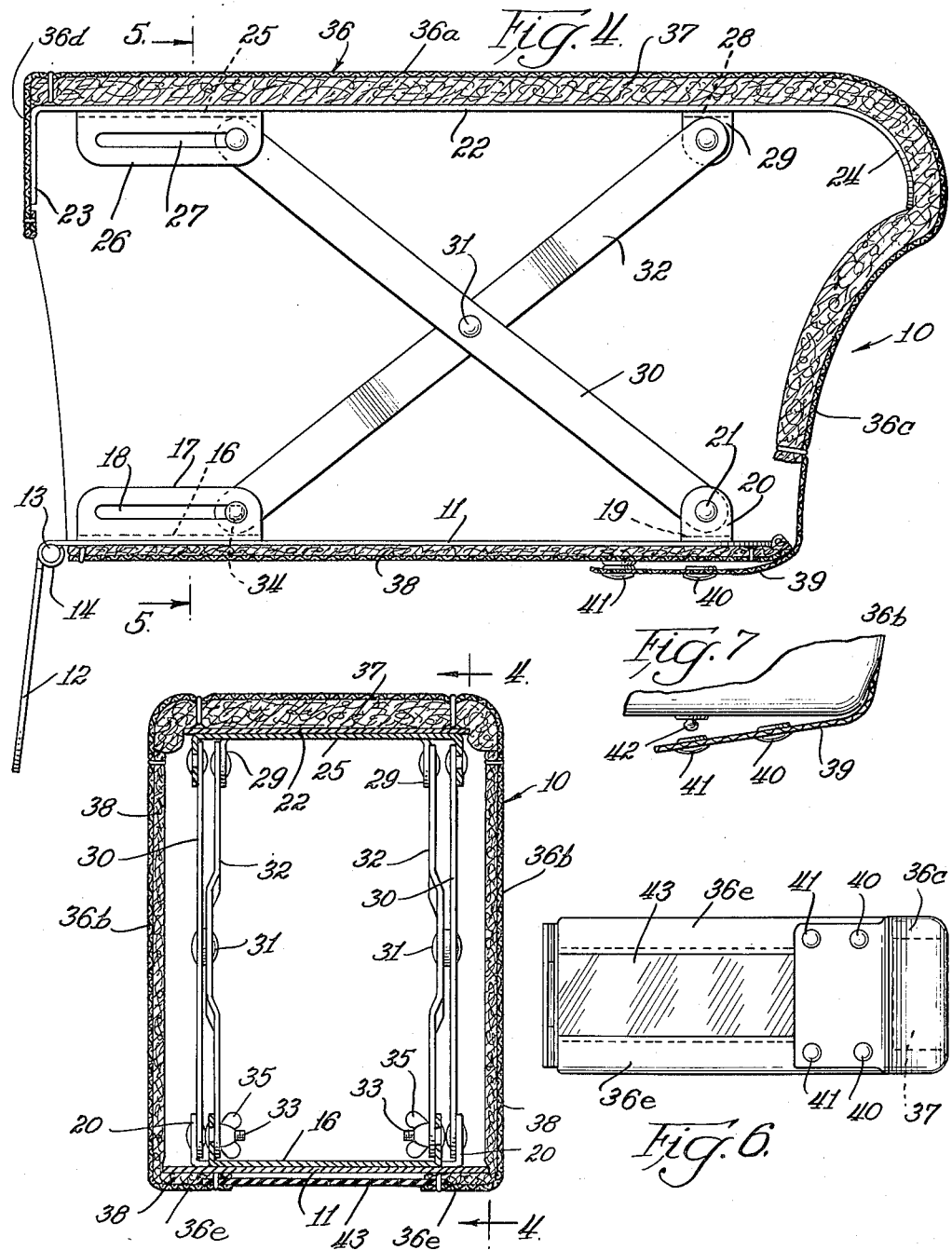

Feb. 9, 1954 S. GOODFELLOW 2,668,582
ARMREST FOR VEHICLE SEATS
Filed Oct. 9, 1948 3 Sheets-Sheet 3
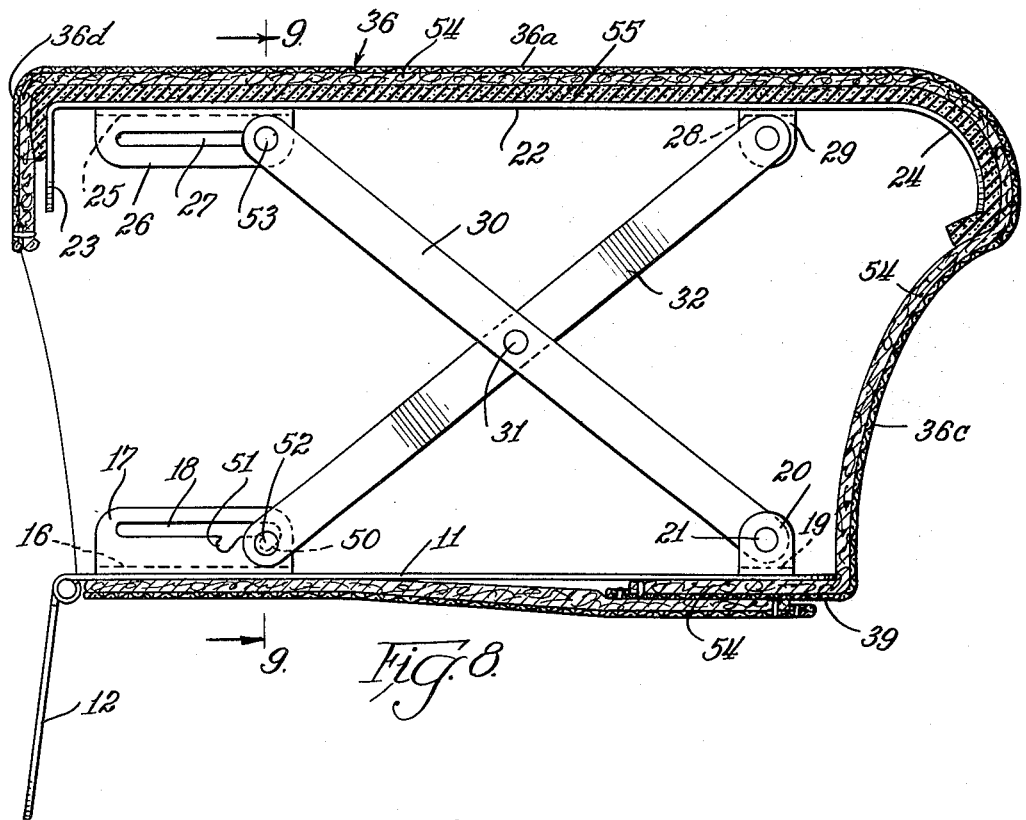
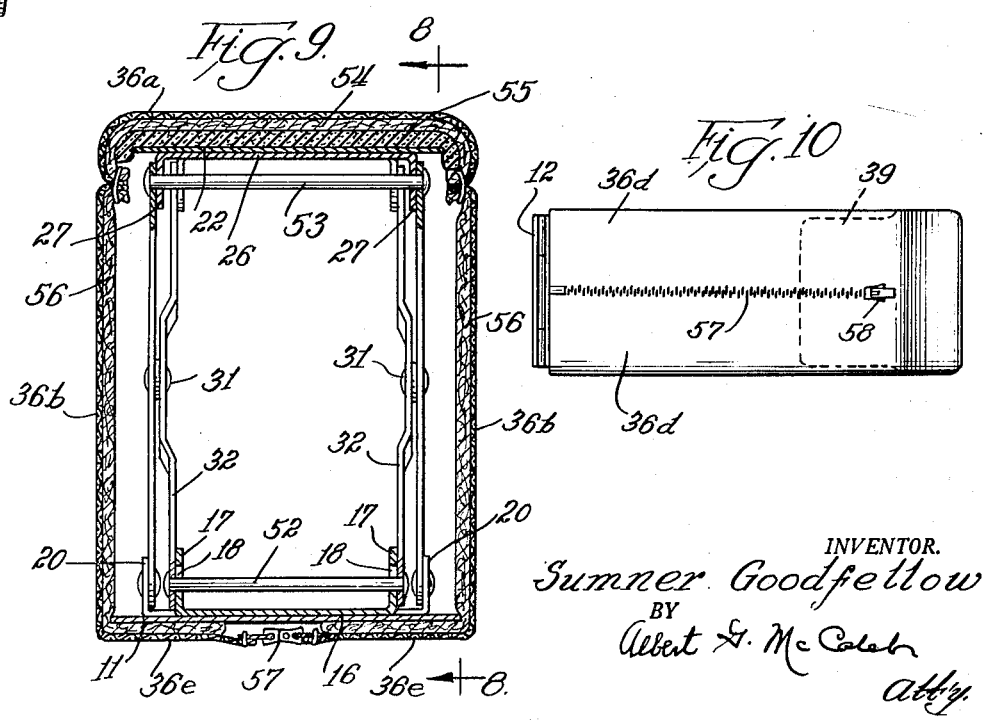
INVENTOR.
Sumner Goodfellow
BY
Albert G. McCaleb
atty.

Patented Feb. 9, 1954

2,668,582

UNITED STATES PATENT OFFICE 2,668,582

ARMREST FOR VEHICLE SEATS

Sumner Goodfellow, Bloomington, Ill.

Application October 9, 1948, Serial No. 53,613

8 Claims. (Cl. 155—112)

My invention contemplates and provides a vehicle seat arm rest that is a portable, adjustable, collapsible and well upholstered unit.

An object of my invention is to provide a vehicle seat arm rest that is portable, adjustable and collapsible.

Another object is to provide an arm rest of the kind mentioned in the last preceding paragraph that is attractively and effectively upholstered in each of its several adjustments.

Another object is to provide a vehicle seat arm rest that is unitary in the sense that, when ready for association with a vehicle seat, it comprises all that is necessary to maintain it in appropriate relation to the cushion and back of the vehicle seat.

Additional objects are to provide an arm rest that is of simple, light and sturdy construction and attractive appearance, that may be economically manufactured, that can be readily placed in and removed from cooperative association with a vehicle seat, and that is so cushioned and covered as to constitute no menace to fur coats or other apparel of users thereof.

The aforementioned and other objects, features and advantages of my invention will appear from the following detailed description of presently preferred illustrative embodiments thereof, wherein reference is made to the accompanying three sheets of drawings in which:

Fig. 1 is a perspective view depicting one illustrative form of my new arm rest as it appears when installed in cooperating association with the cushion and back of a conventional automobile seat;

Fig. 2 is a side elevational view of the arm rest framework as it appears when collapsed to occupy the minimum of space;

Fig. 3 is a vertical sectional view that may be regarded as taken in the plane of the line 3—3 of Fig. 2 and looking in the direction indicated by the arrows;

Fig. 4 is a vertical longitudinal sectional view which may be regarded as taken in the plane of the line 4—4 of Fig. 5 and looking in the direction indicated by the arrows, this view depicting the arm rest as it appears when ready for placement in cooperative association with the cushion and back of an automobile seat;

Fig. 5 is a transverse vertical sectional view that may be regarded as taken in the plane of the line 5—5 of Fig. 4 and looking in the direction indicated by the arrows;

Fig. 6 is a bottom plan view of the arm rest unit;

Fig. 7 is a fragmentary detail view, partly in side elevation and partly in section, depicting snap fastener devices whereby the flap at the lower front of the arm rest cover is secured in different adjustments with respect to the forward end of the under surface of the bottom of such cover;

Fig. 8 is a view similar to Fig. 4, and taken in the plane of the line 8—8 of Fig. 9 and looking in the direction indicated by the arrows, depicting another illustrative embodiment of my invention;

Fig. 9 is a view similar to Fig. 5 and taken in the plane of the line 9—9 of Fig. 8 and looking in the direction indicated by the arrows; and Fig. 10 is a bottom view, similar to Fig. 6, of the arm rest unit illustrated in Figs. 8 and 9.

Similar characters of reference refer to similar parts throughout the several views.

Referring first to Fig. 1, reference letters A and B, respectively, designate the back and cushion of a conventional automobile seat; the rear edge of the seat cushion B lying immediately adjacent to the lower portion of the forwardly presented surface of the seat back A to define the normally closed crack C of substantial depth. Of this crack C and the close fit of the seat parts defining it, I prefer to avail myself as hereinafter explained, in detachably retaining my improved arm rest unit in cooperative association with the seat.

The arm rest unit, indicated as a whole by reference numeral 10, includes an adjustable collapsible framework which desirably, but not necessarily, is formed in its entirety or for the most part of metal. Such framework comprises a generally flat and rectangular lower plate 11. To that end of plate 11 which properly may be regarded as its rear end, is pivoted a generally flat and desirably somewhat stiff tab 12 of substantial area; the pivotal attachment of tab 12 to plate 11 suitably being effected by a pin 13 received by hinge sleeves 14—14 formed integral with plate 11 and cooperating hinge sleeve 15 formed integral with tab 12.

Extending transversely of the upper surface of lower plate 11 near the rear end thereof, and welded or equivalently secured thereto, and terminating substantially short of the longitudinal edges of the plate 11, is a strap 16 provided with upturned edges 17 in which are formed aligned longitudinal slots 18.

Also extending transversely of the upper surface of the lower plate 11 near the front end thereof, and welded or equivalently secured thereto, and terminating short of the longitudinal edges of plate 12, is strap 19 having upturned ends 20 provided with circular rivet-receiving apertures 21. The upturned ends 20 of the strap 19 are closer to the longitudinal edges of plate 11 than are the aforementioned upturned ends 17 of strap 16.

At 22 is an upper plate which has a flat intermediate portion, preferably somewhat narrower and somewhat longer than the lower plate 11, and desirably is provided at its rear end with a sharply down-turned flange 23 and at its forward end with a downwardly and forwardly curving lip 24.

Extending transversely of the lower surface of the upper plate 22 near the rear end thereof and welded or equivalently secured thereto, and preferably terminating slightly short of the longitudinal edges of plate 22, is a strap 25 provided with down-turned ends 26 in which are formed aligned longitudinal slots 27.

Also extending transversely of the lower surface of the upper plate 22 near the front end thereof and welded or equivalently secured thereto, and terminating substantially short of the longitudinal edges of plate 22, is a strap 28 with down-turned ends 29 in which are formed circular rivet-receiving apertures (not shown) corresponding with the previously mentioned rivet-receiving apertures 21.

The framework being described also comprises a pair of bars 30 each of which has one end rivet-pivoted to one of the upturned ends 20 of the cross strap 19 carried by the lower plate 11. The other end of each such bar 30 is slidingly pivoted to one of the down-turned ends 26 of the cross strap 25 carried by the upper plate 22; the sliding pivot being effected by a rivet occupying and adapted to move longitudinally of one of the slots 27.

Each of the bars 30 is rivet-pivoted intermediate its ends, as indicated at 31, to the intermediate portion of a cooperating bar 32. Each of the bars 32 has one end thereof rivet-pivoted to a down-turned end 29 of the cross strap 28 carried by the upper plate 22; the other end of each of these bars 32 pivotally receiving a circular shank portion of a carriage bolt 33. Each bolt 33 has a polygonal portion 34, immediately adjacent its head, which occupies and is slidable but nonrotatable in the slot 18 formed in one of the upturned ends of the cross strap 16 carried by the lower plate 11. Associated with each of the bolts 33 is a wing nut 35.

With the wing nuts 35 tightened and their cooperating bolts 33 occupying the forward ends of the slots 18, the framework of the arm rest unit is maintained in its most fully extended condition depicted in Fig. 4. When the bolts 33 are moved to the rear ends of the slots 18, the framework is in its fully collapsed condition depicted in Fig. 2. By securing the bolts 33 in different positions slightly removed from the forward ends of the slots 18, the spacing between the plates 11 and 22, and thus the over-all height of the arm rest unit, may be varied to suit individual preferences.

In addition to the adjustable collapsible framework just described, my new arm rest comprises a novel tailored sheath or cover which I shall now describe. Such sheath or cover, being designated as a whole by reference numeral 36, comprises the top wall 36a, side walls 36b, front wall 36c, and partial rear wall 36d. Such walls of the sheath, being joined integrally or otherwise at their contiguous edges, are formed of a textile fabric or other suitable flexible material. The lower edges of the sheath side walls 36b join, integrally or otherwise, spaced apart flange-like strips 36e of flexible material which are adapted to underlie the longitudinal edge portions of bottom plate 11.

Stitched or otherwise suitably secured to the inner surfaces of top wall 36a and front wall 36c of the sheath is an elongated and desirably relatively soft flexible pad 37 which rests upon the top surface of upper plate 22 and overhangs its lateral edges as shown in Fig. 5. Such pad 37 also desirably overhangs and depends substantially beneath the lip portion 24 of the top plate 22.

Stitched or otherwise suitably secured to the inner surfaces of the sheath side walls 36b and the flange-like strips 36e, are the desirably soft flexible pads 38 which are adapted to lie alongside of, but preferably laterally spaced from, the framework bars 30 and 32, and to underlie the longitudinal edge portions of the under-surface of the bottom plate 11, as is also clearly shown in Fig. 5.

Carried with the sheath end wall 36c, as a downward extension and desirably as an integral part thereof, is a flap 39. This flap 39 desirably is provided with two pairs of female snap fastener elements 40 and 41 adapted, selectively, to cooperate with male snap fastener elements 42 carried by flange-like sheath portions 36e at points equidistantly spaced from the front ends of such portions 36e.

Bridging the space between the two flange-like portions 36e of the sheath and stitched or otherwise secured to the opposed edges of such portions 36e, is a stretchable web 43 which, together with such portions 36e, constitutes the bottom wall of the arm rest sheath. Web 43 may be formed from any one of the well known stretchable fabrics, usually formed of rubber and cotton or other suitable fibrous material, which have been available for many years. While I prefer to bridge the space between sheath portions 36e by a single stretchable web 43, equivalent results may be realized by utilizing a plurality of smaller webs for the same purpose.

Preparatory to placing my new arm rest in serviceable association with an automobile or other comparable vehicle seat, the arm rest framework is inserted into its sheath through the rear end of the latter, the upper and lower portions 11 and 12 of the framework are separated to the permissible degree desired, and the wing nuts 35 are then tightened upon their cooperating bolts 33 to maintain the effected adjustment. If the effected adjustment is the one which accords the arm rest its maximum over-all height, the fastener elements 41 are caused to engage the fastener elements 42 when the front wall flap 39 is turned under the forward ends of the web 43 and the flange-like extensions of the sheath side walls 36e. If the effected adjustment is one which accords the arm rest a lesser appropriate over-all height, the fastener elements 40 rather than the fastener elements 41 may be caused to cooperate with the fastener elements 42. Regardless of which of these over-all heights has been accorded the arm rest framework, the web 43 serves to maintain the sheath side walls 36b stretched with attractive tautness between the lower plate 11 and the upper plate 22, while the cooperation of the snap fasteners, and the lower forward end of the pad 37, cause the sheath front wall to drape gracefully between the lip 24 of the upper plate 22 and the forward end of the lower plate 11.

All that now remains to be done in order to place the arm rest in serviceable assembly with the back element A and the cushion element B of a vehicle seat of the kind shown in Fig. 1, is to force the tab 12 into the crack C to maintain the arm rest at an appropriate preferred position on the cushion B and to retain the rear end of the arm rest, and more particularly flange 23 of the arm rest framework, in contiguity with or closely adjacent to the opposed portion of the seat back A.

The arm rest unit of Figs. 8, 9 and 10 differs from the unit of the preceding figures in the several respects next to be discussed.

The upturned strap ends or lugs 17 carried by lower plate 11 lie inside rather than outside of their associated frame bars 32 and each slot 18 is provided with a pair of rearwardly and downwardly inclined cove or detent recesses 50 and 51. A rod 52 connecting the lower ends of bars 32 extends through the strap ends or lugs 17 for longitudinal movement in the slots 18 thereof and for seating in either the recesses 50 or the recesses 51 thereof, as desired. When rod 52 occupies recesses 50, the framework of the arm rest unit is maintained in its most fully extended condition and when rod 52 occupies recesses 51 such framework is maintained in less extended condition.

The downturned strap ends or lugs 26 carried by upper plate 22 also lie inside rather than outside of their associated frame bars 30, and the upper ends of those frame bars 30 are connected by a rod 53 which extends through and is movable longitudinally of the slots 27.

The carriage bolts 33 and their wing nuts 35, of the collapsible frame first described, are dispensed with in the collapsible frame of Figs. 8, 9 and 10.

Other than as above noted, the collapsible framework of Figs. 8, 9 and 10 need not differ materially from the corresponding framework of the preceding figures.

The top wall 36a of the sheath depicted in Figs. 8, 9 and 10 is provided with a pad-like lining 54 which is wide enough and long enough to line the uppermost portions of the side walls 36b, the partial rear wall 36d, the front wall 36c, and the front wall flap 39. Cemented or otherwise adhesively attached to the inner surface of lining 54 is a sheet or block 55 of very porous, light and resiliently compressible natural or artificial rubber which is wide enough and long enough to cover the upper surface of plate 22 and somewhat overlap its longitudinal edges and ends, as shown.

The major portions of the sheath side walls 36b, i. e., the portions thereof not lined by the pad-like member 54, are lined by the similar pad-like members 56 which also line those spaced-apart flange-like portions 36e of the sheath which underlie the longitudinal marginal portions of plate 11.

In the sheath 36 of Figs. 8, 9 and 10 the opposed spaced-apart edges of the flange-like portions 36e are adapted to be detachably connected by conventional slide or zipper fastener elements indicated at 57 and 58.

In the serviceable condition of the sheath 36 of Figs. 8, 9 and 10, it is sufficient to have the front wall flap 39 lie between the front end of plate 11 and the corresponding ends of the fastener connected flange-like portions 36d.

In the arm rest unit of Figs. 8, 9 and 10 the resiliently compressible sheet or block 55 serves well the function of the resiliently stretchable web 43 of the unit of the preceding figures. In other words, such sheet or block 55 functions to maintain the sheath side walls 36b taut between the longitudinal edges of the upper plate 22 and the lower plate 11 regardless of whether the arm rest unit has been accorded its maximum overall height by causing rod 52 to occupy its cooperating detent recesses 50 or has been accorded a lesser overall height by causing such rod 50 to occupy detent recesses 51.

The sheathed framework of Figs. 8, 9 and 10 may be collapsed, to occupy a minimum of space, in substantially the same manner as the corresponding framework of the preceding figures.

Having illustrated and described two practical and presently preferred embodiments of my invention, I realize that my invention may take other and specifically different forms. Therefore, what I claim as new and desire to secure by Letters Patent of the United States is:

1. An arm rest unit comprising a collapsible framework including upper and lower plates, and a flexible sheath therefor having top, bottom, end, and side walls, and a padding for the top and end walls to make the sheath appreciably thicker at these walls than at the other walls, the padding lying above the upper plate and overhanging the longitudinal edges thereof.

2. An arm rest unit comprising a flexible sheath and a framework fitting therein and comprising spaced upper and lower plates, two pairs of crossed links pivoted to one another at their mid portions, one end of the links being pivotally connected to the upper and lower plates, members with elongated slots secured to the plates, and pins carried by the other ends of the links and being slidable in the elongated slots to vary the spacing between the upper and lower plates.

3. An arm rest as specified in claim 2, certain of the pins being of non-circular section so as to be non-rotatable in the elongated slots, the arm rest further including nuts threaded on the non-circular pins to clamp them against the members and prevent movement of the said other ends of the links along the slots.

4. An arm rest as specified in claim 2, certain of the members having recesses extending from the elongated slots into which recesses the pins can fit to hold the said other ends of the links against movement along the slots.

5. An arm rest unit comprising a collapsible framework and a flexible sheath therefor comprising top, bottom and side walls, and a layer of resilient deformable material in contact with the sheath and with one wall of the framework and compressed therebetween to maintain the sheath walls tautened over the framework.

6. An arm rest unit as specified in claim 5, the resilient deformable material being in the form of a pad disposed between the top wall of the sheath and the top of the framework.

7. An arm rest unit as specified in claim 5, the resilient deformable material constituting the bottom wall of the sheath.

8. An arm rest unit comprising a collapsible framework including upper and lower plates, and a flexible sheath therefor having top, bottom, and side walls, and also an end wall extending as a continuation of the top wall and terminating in overlapping relation with one end of the bottom wall, the terminal portion of the end wall of the sheath overlapping the bottom wall lying between the bottom wall and the lower plate of the framework, the arm rest unit having a pad of resilient deformable material compressed between the top wall of the sheath and the upper plate of the framework to tauten the sheath side walls.

SUMNER GOODFELLOW.

References Cited in the file of this patent

UNITED STATES PATENTS

| Number | Name | Date |
|---|---|---|
| 544,821 | Morrison | Aug. 20, 1895 |
| 697,752 | Rikli | Apr. 15, 1902 |
| 1,019,658 | King | Mar. 5, 1912 |
| 1,063,809 | Lawson | June 3, 1913 |
| 1,303,043 | De Long | May 6, 1919 |
| 1,573,721 | Loeffler | Feb. 16, 1926 |
| 2,043,626 | Morrison | June 9, 1936 |
| 2,086,244 | Smith | July 6, 1937 |
| 2,128,435 | Shippee | Aug. 30, 1938 |
| 2,145,669 | Thompson | Jan. 31, 1939 |
| 2,434,641 | Burns | Jan. 20, 1948 |
| 2,524,659 | Gorman | Oct. 3, 1950 |
| 2,524,909 | Hines | Oct. 10, 1950 |

FOREIGN PATENTS

| Number | Country | Date |
|---|---|---|
| 490,233 | Great Britain | Aug. 11, 1938 |